April 18, 1961 C. H. BRAUCHLER ET AL 2,979,973
METHOD OF MAKING HARD-FACED EXTRUSION DIES
Original Filed Aug. 25, 1958 2 Sheets-Sheet 1

INVENTORS
Chandis H. Brauchler and
Frank J. Welchner

BY Frease, Bishop, Johns & Schick
ATTORNEYS

April 18, 1961 C. H. BRAUCHLER ET AL 2,979,973
METHOD OF MAKING HARD-FACED EXTRUSION DIES
Original Filed Aug. 25, 1958 2 Sheets-Sheet 2
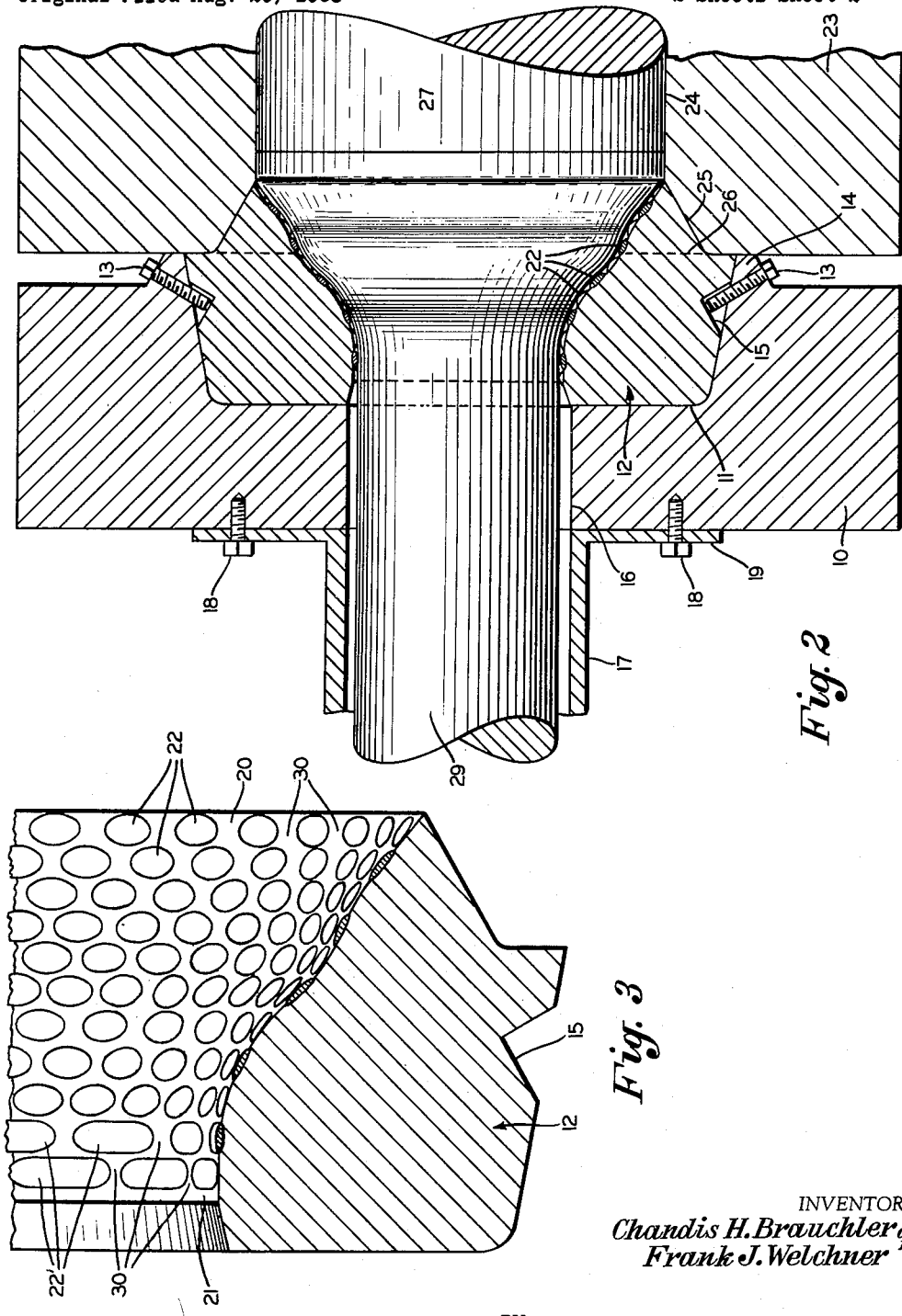
INVENTORS
Chandis H. Brauchler and
Frank J. Welchner
BY Frease, Bishop, Johns & Schick
ATTORNEYS United States Patent Office 2,979,973
Patented Apr. 18, 1961

2,979,973

METHOD OF MAKING HARD-FACED EXTRUSION DIES

Chandis H. Brauchler and Frank J. Welchner, Canton, Ohio, assignors to The Canton Drop Forging & Manufacturing Company, Canton, Ohio, a corporation of Ohio Original application Aug. 25, 1958, Ser. No. 756,792. Divided and this application Jan. 21, 1959, Ser. No. 788,111

6 Claims. (Cl. 76—107)

The invention relates to the extrusion of bars, rods and various cross-sectional shapes from heated blanks of alloy steels, heat-resisting alloys, stainless steels, molybdenum, titanium alloys and similar metals, and more particularly to the method of making a hard-faced extrusion die through which the hot metal is extruded and the present application is a division of our copending application, Serial No. 756,792, filed August 25, 1958.

While aluminum and similar relatively soft metals may be extruded through dies formed of basic die material such as tool or die steel without undue wear upon the die, it is not commercially practical to extrude alloy steels and similar relatively hard metals through such dies, owing to the excessive wear upon the dies which causes them to become scored and worn to such an extent that they soon become unusable and must be frequently replaced.

For this reason it is common practice to provide a relatively thin layer of suitable hard-facing material, such for example as a cobalt base alloy, a tungsten base alloy, and similar heat and wear-resisting alloys upon the inner surface of the steel die, so as to resist the wear and high temperature of relatively hard metals being extruded therethrough.

In the construction of such dies, the steel die is first formed from hot work die steel to desired shape. The steel die is then heat treated, after which a relatively thin layer of the hard-facing material is applied over the entire inner surface of the steel die by welding.

If this layer of hard-facing material is applied before the die is heat treated to the required hardness for the basic die material, the hard facing frequently spalls off because of its different expansion coefficient, due to temperature.

If the hard-facing layer is applied after the die is heat treated to the required hardness for the basic die material, some of the hardness produced in the die by heat treatment is destroyed. The die then requires stress-relieving to minimize the stresses incurred from the application of the hard facing.

Also, the alternate heating and cooling of present dies during and between extrusion operations results in expansion and contraction of the die. Due to the differences in expansion characteristics of the hard-facing material and the basic die material, cracks result in the hard-facing material which then lead to complete die failure.

We have discovered that the application of the hard-facing material in spaced spots or knobs over the die extrusion face permits expansion and contraction thereof to take place between said spots, so that the expansion and contraction is occurring primarily in the basic die material and thus eliminates cracking of the hard facing. The location of the hard-facing material in spaced knobs upon the die extrusion face provides pockets or recesses between the hard-facing knobs for holding lubricant during the extrusion operation.

The present invention contemplates a method of making a hard-faced extrusion die which overcomes the disadvantages of present practice and which is hardened by heat treatment.

Another object of the invention is to provide a method of making hard-faced extrusion dies provided with spaced knobs or projections of hard-facing material located over the entire inner surface of the die.

A further object of the invention is to provide a method of making an extrusion die of the character referred to in which the spaced knobs or projections of hard-facing material are located in rows, the knobs in each row being staggered relative to those in adjacent rows.

A still further object of the invention is to provide such a method by forming such an extrusion die by finish machining a die of basic die material, then welding spaced knobs or projections of hard-facing material, such as a cobalt-base alloy, tungsten-base alloy, or similar heat and wear-resisting alloys upon the inner face of the die, and then heat treating the completed structure.

The above objects together with others which will be apparent from the following description, or which may be later pointed out, may be attained by carrying out the method of making an extrusion die in the manner hereinafter described in detail and illustrated in the accompanying drawings, in which:

Fig. 2 is a similar view showing the manner of extrusion; and,

Fig. 3 is an enlarged fragmentary sectional view of the extrusion die.

Referring now more particularly to the embodiment of the invention illustrated, in which similar numerals refer to similar parts throughout the several views, a portion of an extrusion press is shown provided with a hard-faced extrusion die constructed in accordance with the invention.

Figure 1:
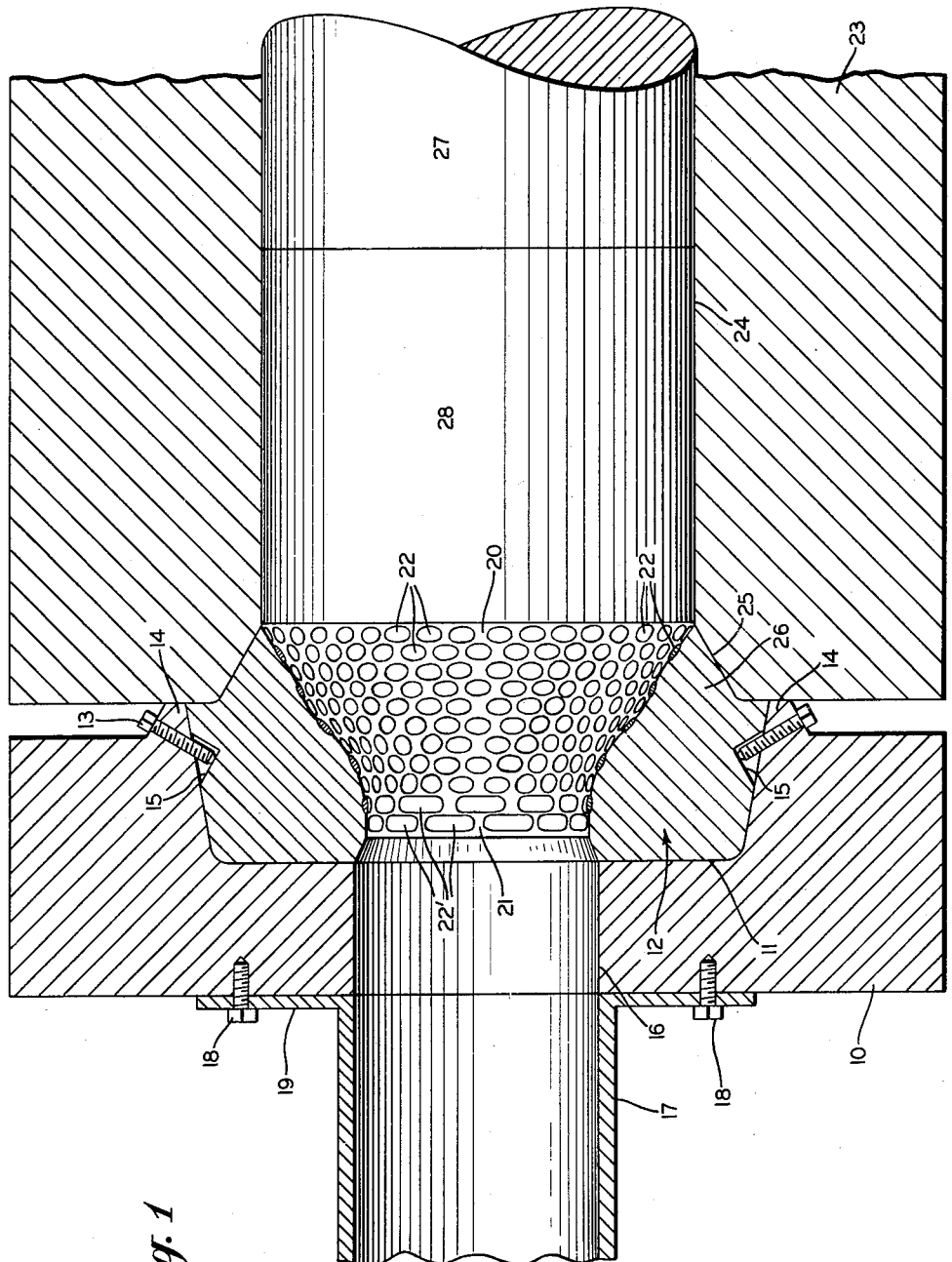
Fig. 1 is a longitudinal sectional view through a portion of an extrusion press provided with the improved hard-faced extrusion die, showing a heated blank positioned in the extrusion chamber and the plunger in position to extrude the same through the die opening.

Although the hard-faced extrusion die made by the novel method is shown for the purpose of illustration as applied to a horizontal extrusion press, it should be understood that the die to which the invention pertains is equally applicable to vertical extrusion presses without any change in the extrusion face of the die.

The die holder 10 is adapted to be mounted upon the bed of a hydraulic extrusion press and is provided in its outer surface with a recess 11 shaped to receive the extrusion die indicated generally at 12, to which the invention pertains.

The die 12 may be retained within the recess 11 by the screws 13 located through the upwardly extending annular flange 14 upon the top of the die holder 10 and surrounding the upper open end of the die-receiving recess 11. These screws are disposed forwardly and inwardly and are received in the annular groove 15 formed in the periphery of the die 12.

A central opening 16 is formed through the inner side of the die holder 10, of slightly larger cross-sectional dimensions than the product to be extruded from the die 12, and communicates with the inner side of the die-receiving recess 12 of the die holder 10.

The guide tube 17 for the extruded product is attached to the inner face of the die holder 10, as by the cap screws 18 located through the annular flange 19 upon the adjacent end of the guide tube, and threaded into the die holder 10. This guide tube, as shown in Figs. 1 and 2, has an inside diameter substantially the same as the diameter of the opening 16 in the die holder 10, with which it communicates, so that products extruded from the die 12 may be guided therethrough.

The extrusion die 12, made by the method to which the invention pertains, is formed of basic die material, such as hot work die steel capable of being hardened by conventional heat-treating methods. An opening 20 is formed through the die 12, tapered from the front side of the die toward the opposite thereof, and terminating in the reduced extrusion opening 21 of the cross-sectional size and shape desired in the extruded article.

For the purpose of the invention the walls of the die opening 20 are provided with a multiplicity of spaced knobs or projections of hard-facing material as indicated at 22. These knobs may be substantially circular except the last two rows which are preferably elongated as shown at 22' in the drawings, and they are preferably located in rows, the knobs in each row being staggered relative to the knobs in adjacent rows, and the rows of knobs extending entirely over the surfaces of the walls of the die opening so that metal being extruded through the die will contact only the knobs of hard-facing material as it passes through the die opening.

The knobs or projections 22 and 22' of hard-facing material are very thin, preferably being only about 1/64 inch in thickness in actual practice. Due to the extreme heat required to weld these knobs of hard-facing material upon the die, the adjacent portions of the surface of the extrusion face of the basic die are fused, causing the knobs of hard-facing material to be fused and slightly embedded in the extrusion face of the basic die, as shown in the drawings, to a height sufficient to avoid dilution of the basic die material.

The hard-facing material of which the knobs are formed may be a cobalt-base alloy, a tungsten-base alloy or similar heat and wear-resistant material. A typical cobalt-base alloy suitable for the purpose may be of the following nominal analysis:

| | Percent |
| --- | --- |
| Cobalt | 55 |
| Chrome | 33 |
| Tungsten | 6 |
| Iron | Remainder |

Such a cobalt-base alloy is a heat and wear-resistant alloy which resists the high temperature at which metals such as normal low alloy steels, stainless steels, heat-resisting alloys, molybdenum and titanium alloys are extruded and the severe wear caused by the extrusion of such metals. A very satisfactory cobalt-base alloy having the above properties and of substantially the above analysis may be commercially obtained under the trade name Stellite No. 6.

The knobs 22 and 22' of cobalt-base alloys, or other suitable hard-facing material, are applied to the extrusion surface of the interior of the steel die by electric arc welding with a coated rod, or by an uncoated rod, by Heliarc or atomic hydrogen welding, applying the knobs in closely spaced relation in staggered rows as indicated.

After the knobs of hard-facing material are thus applied to the interior of the die by welding, the composite structure is then hardened and tempered by conventional heat-treating method suitable for the basic die material.

The extrusion press shown in the drawings may include the cylinder or container 23, located in front of the extrusion die 12. As shown, the container 23 is provided with the longitudinal opening 24 therein, of a diameter substantially the same as the adjacent end of the die opening 20, and terminating in the conformation 25 which receives the similar conformation 26 upon the adjacent end of the die 12.

As in usual practice in extrusion presses, a ram 27 is adapted to be thrust forward longitudinally within the container 23, by means of hydraulic power means or the like.

In using the improved hard-faced extrusion die for the extrusion of metal shapes in a press of the character illustrated, a bar blank or block of the steel or alloy to be extruded, and of the required cross-sectional size and length, is heated to the proper temperature for extrusion of the particular metal.

This heated blank is placed in the container 23 as indicated at 28 in Fig. 1, and the ram 27 is moved into contact with the heated blank as shown in said figure. Continued forward movement of the ram under the extreme pressure of the hydraulic press will force the heated metal of the blank 28 through the die opening 20, over the multiplicity of hard-facing alloy knobs 22 and 22' therein, forming die-extruded product 29 as shown in Fig. 2, of the cross-sectional shape of the reduced end 21 of the die opening, and of desired length.

The hard-facing alloy knobs 22 and 22' on the extrusion surface of the die opening, being of high temperature and wear-resistant material, will withstand the extreme pressure and temperature to which they are subjected during the extrusion operation.

By applying the hard-facing material to the extrusion face of the die in the form of spaced knobs or spots, expansion of the basic die material, due to temperature changes during operation, is permitted without cracking the hard-facing material.

These spaced knobs of hard-facing material provide connecting recesses or pockets 30, around and between the hard-facing knobs, over te entire extrusion face of the die. These recesses or pockets provide means for effectively holding lubricant during the extrusion operation; this being a considerable advantage over conventional practice in which the continuous layer of hard-facing material located over the entire extrusion face of the die provides no means for holding lubricant thereon during the extrusion operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. The method of making a hard-faced extrusion die which consists in providing a body of die steel having a tapered opening therethrough terminating in an extrusion opening of the size and shape desired in the extruded article, then welding spaced knobs of hard-facing alloy upon the walls of said opening, and then heat treating the composite structure.

2. The method of making a hard-faced extrusion die which consists in providing a body of die steel having a tapered opening therethrough terminating in an extrusion opening of the size and shape desired in the extruded article, then welding staggered rows of spaced knobs of hard-facing alloy upon the walls of said opening, and then heat treating the composite structure.

3. The method of making a hard-faced extrusion die which consists in providing a body of die steel having a tapered opening therethrough terminating in an extrusion opening of the size and shape desired in the extruded article, then welding spaced knobs of hard-faced alloy upon the walls of said opening in staggered relationship over the entire area of said walls, and then heat treating the composite structure.

4. The method of making a hard-faced extrusion die which consists in providing a body of die steel having a tapered opening therethrough terminating in an extrusion opening of the size and shape desired in the extruded article, then welding spaced knobs of hard-facing alloy upon the walls of the tapered portion of said opening, and welding similar knobs slightly elongated circumferentially of said opening upon the walls of the extrusion opening, and then heat treating the composite structure.

5. The method of making a hard-faced extrusion die which consists in providing a body of die steel having a tapered opening therethrough terminating in an extrusion opening of the size and shape desired in the extruded article, then welding spaced knobs of hard-facing alloy upon the entire area of said opening so as to provide recesses between said spaced knobs, and then heat treating the composite structure.

6. The method of making a hard-faced extrusion die which consists in providing a body of die steel having a tapered opening therethrough terminating in an extrusion opening of the size and shape desired in the extruded article, then welding spaced knobs of cobalt-base alloy containing about 55% cobalt, 33% chrome, 6% tungsten and the remainder iron, upon the walls of said opening, and then heat treating the composite structure.

References Cited in the file of this patent

UNITED STATES PATENTS

| | | |
|---|---|---|
| 2,027,787 | Ridgway et al. | Jan. 14, 1936 |
| 2,239,425 | Jacobson | Apr. 22, 1941 |
| 2,882,759 | Altwicker | Apr. 21, 1959 |